US008693285B2

(12) United States Patent
Watanabe et al.

(10) Patent No.: US 8,693,285 B2
(45) Date of Patent: Apr. 8, 2014

(54) SOUND GENERATION SYSTEM, ULTRASONIC WAVE EMITTING DEVICE, AND ULTRASONIC WAVE EMITTING METHOD

(75) Inventors: Ayase Watanabe, Kanagawa (JP); Takashi Motoyama, Kanagawa (JP); Koji Arata, Kanagawa (JP); Tatsuyuki Negishi, Tokyo (JP); Takafumi Tokuhiro, Kanagawa (JP)

(73) Assignee: Panasonic Corporation, Osaka (JP)

(*) Notice: Subject to any disclaimer, the term of this patent is extended or adjusted under 35 U.S.C. 154(b) by 0 days.

(21) Appl. No.: 13/805,541

(22) PCT Filed: May 20, 2011

(86) PCT No.: PCT/JP2011/002818
§ 371 (c)(1),
(2), (4) Date: Dec. 19, 2012

(87) PCT Pub. No.: WO2012/001871
PCT Pub. Date: Jan. 5, 2012

(65) Prior Publication Data
US 2013/0094331 A1   Apr. 18, 2013

(30) Foreign Application Priority Data

Jul. 2, 2010   (JP) ................................ 2010-152046

(51) Int. Cl.
*G01S 15/50*   (2006.01)
*G01S 15/88*   (2006.01)
*A61H 3/06*   (2006.01)

(52) U.S. Cl.
CPC ..................................... *A61H 3/061* (2013.01)
USPC .......................................................... 367/96

(58) Field of Classification Search
CPC ............ H04R 3/00; G08B 3/10; G08G 1/005; G08G 1/16; B60Q 5/008
USPC ....................... 367/96, 95, 92, 91, 90, 89, 137
See application file for complete search history.

(56) References Cited

U.S. PATENT DOCUMENTS

2013/0094331 A1 *   4/2013   Watanabe et al. ............. 367/137

FOREIGN PATENT DOCUMENTS

EP        2590431       *  5/2013
JP        08-297798 A     11/1996
(Continued)

OTHER PUBLICATIONS

International Search Report for PCT/JP2011/002818 dated Aug. 9, 2011.

*Primary Examiner* — Daniel Pihulic
(74) *Attorney, Agent, or Firm* — Pearne & Gordon LLP

(57) ABSTRACT

Disclosed are a sound generation system, an ultrasonic wave emitting device, and an ultrasonic wave emitting method which utilize the principle of parametric speakers (which uses the difference between frequencies of two ultrasonic waves) and which are capable of allowing target persons in a prescribed area to hear a sound only when a mobile body approaches said prescribed area. An alert system (10) has an ultrasonic wave emitting device (100) mounted on a mobile body (200), and an ultrasonic wave emitting device (300) permanently installed near an area (A101). The ultrasonic wave emitting device (300) emits a first ultrasonic wave towards an area at least including the aforementioned area (A101), and meanwhile, the ultrasonic wave emitting device (100) emits a second ultrasonic wave. The ultrasonic emitting device (100) forms the second ultrasonic wave by means of modulating the ultrasonic wave of frequency f1 with an audible signal.

6 Claims, 19 Drawing Sheets

(56) References Cited

FOREIGN PATENT DOCUMENTS

| | | |
|---|---|---|
| JP | 11-145915 A | 5/1999 |
| JP | 2000-279646 A | 10/2000 |
| JP | 2005-306301 A | 11/2005 |
| JP | 2007-237831 A | 9/2007 |
| JP | 2008-114613 A | 5/2008 |
| WO | WO 2012/001871 * | 1/2012 |

* cited by examiner

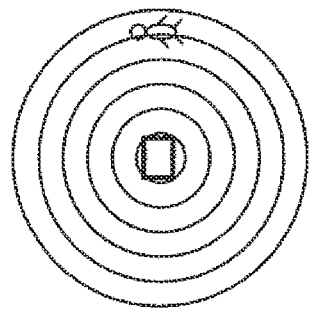
FIG.9A
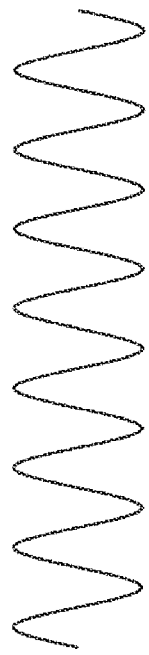
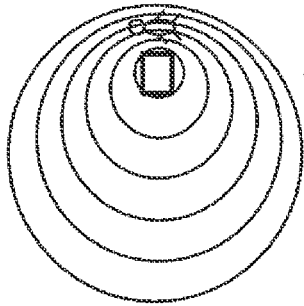
FIG.9B
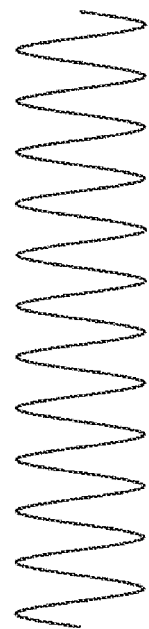
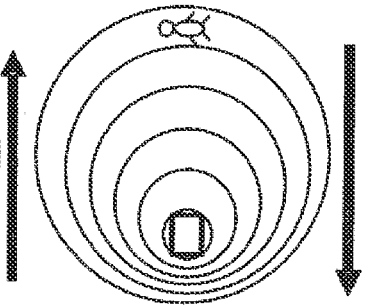
FIG.9C

SOUND GENERATION SYSTEM, ULTRASONIC WAVE EMITTING DEVICE, AND ULTRASONIC WAVE EMITTING METHOD

TECHNICAL FIELD

The claimed invention relates to a sound generating system, an ultrasound emitting apparatus, and a method of emitting an ultrasound wave.

BACKGROUND ART

A sound generating apparatus is used to allow a pedestrian to know the status inside an intersection by means of speech information, for example.

For example, a warning sound generating apparatus disclosed in Patent Literature 1 emits two types of ultrasound waves having different frequencies from different fixed parts, respectively, and allows a pedestrian present in an area in which the two types of ultrasound waves overlap with each other to hear a sound alarm. Specifically, the warning sound generating apparatus emits the first ultrasound wave (frequency fa) and the second ultrasound wave (frequency fb different from frequency fa) from two generators placed on street sides, respectively, and generates an audible sound having frequencies fa-fb in the area in which the first ultrasound wave and the second ultrasound wave overlap with each other. A principle of generating the audible sound is based especially on a "principle of a parametric speaker with reference to a frequency shift between two types of ultrasound waves." Accordingly, allowing only the pedestrian present in a fixed area in which the first ultrasound wave and the second ultrasound wave overlap with each other to hear necessary information is possible.

In addition, an attention calling apparatus disclosed in Patent Literature 2 emits an ultrasound wave having a single frequency, and allows a pedestrian present in a specific area to hear a sound alarm. Specifically, the attention calling apparatus includes an ultrasonic sonar, and is mounted on a moving object (e.g., vehicle). The attention calling apparatus emits an ultrasound wave (i.e., frequency fd), which is generated by performing amplitude modulation on ultrasound waves (i.e., frequency fc) with audible signals (i.e., audio signals), at a sound pressure level of 110 dB or more to a predetermined region, and generates the audible sound within an area covered by the generated ultrasound wave. The principle of generating this audible sound is based especially on a "principle of a parametric speaker with reference to nonlinear characteristics when an ultrasound wave propagates through the air." Accordingly, for example, it is possible to allow only a pedestrian who enters a dangerous area in front of a vehicle to hear warning information.

CITATION LIST

Patent Literature

PTL 1
Japanese Patent Application Laid-open No. 8-297798
PTL 2
Japanese Patent Application Laid-Open No. 2005-306301

SUMMARY OF INVENTION

Technical Problem

However, according to the above warning sound generating apparatus, an audible sound is always generated in a fixed area. Thus, for example, when an intersection is defined as the fixed area, a pedestrian always hear the audible sound even in the case of no vehicle. In other words, even when there is less need to call attention of the pedestrian, the pedestrian hears a warning sound.

In the meantime, the above attention calling apparatus can call attention of a target person who comes close to a moving object. However, there is a problem that the apparatus calls attention of even a person who is present in the same direction as the target person but whose attention need not be called. For example, although calling attention of a pedestrian on a sidewalk with a guardrail is not required, the apparatus calls attention of even a pedestrian on the sidewalk when a target person is present on a crosswalk in front of the guardrail. As an example, the apparatus calls attention of a person inside a building facing a street.

The claimed invention has been implemented taking into account the problems described above, and it is an object of the claimed invention to provide a sound generating system, an ultrasound emitting apparatus, and a method of emitting an ultrasound wave that can use a principle of a parametric speaker will reference to a frequency shift between two types of ultrasound waves and thus allow a target person present in a predetermined area to hear a sound alarm only when a moving object comes close to the predetermined area.

Solution to Problem

According to an aspect of the claimed invention, a sound generating system including: a first ultrasound emitting apparatus that emits first ultrasound wave; and a second ultrasound emitting apparatus that emits second ultrasound wave, the second ultrasound emitting apparatus comprising: an ultrasound signal generating section that generates ultrasound signals that have the same frequency as the first ultrasound wave; an audible signal generating section that generates audible signals; and a modulation section that generates the second ultrasound wave through modulation of the ultrasound signals with the audible signals.

According to an aspect of the claimed invention, an ultrasound emitting apparatus that emits an ultrasound wave, the apparatus including: an ultrasound signal generating section that generates ultrasound signals; an audible signal generating section that generates audible signals; and a modulation section that generates the ultrasound wave through modulation of the ultrasound signals with the audible signals.

According to an aspect of the claimed invention, a method of emitting an ultrasound wave in an ultrasound emitting apparatus that is mounted on a moving object, the method including: generating ultrasound signals; generating audible signals; and generating an ultrasound wave through modulation of the ultrasound signals with the audible signals.

Advantageous Effects of Invention

The claimed invention can provide a sound generating system, an ultrasound emitting apparatus, and a method of emitting an ultrasound wave that can use principle of a parametric speaker with reference to a frequency shift between types of ultrasound waves and allow a target person present in a predetermined area to hear a sound alarm only when a moving object comes close to the predetermined area.

BRIEF DESCRIPTION OF DRAWINGS

FIG. 9 explains the Doppler effect;

DESCRIPTION OF EMBODIMENTS

Figure 1:
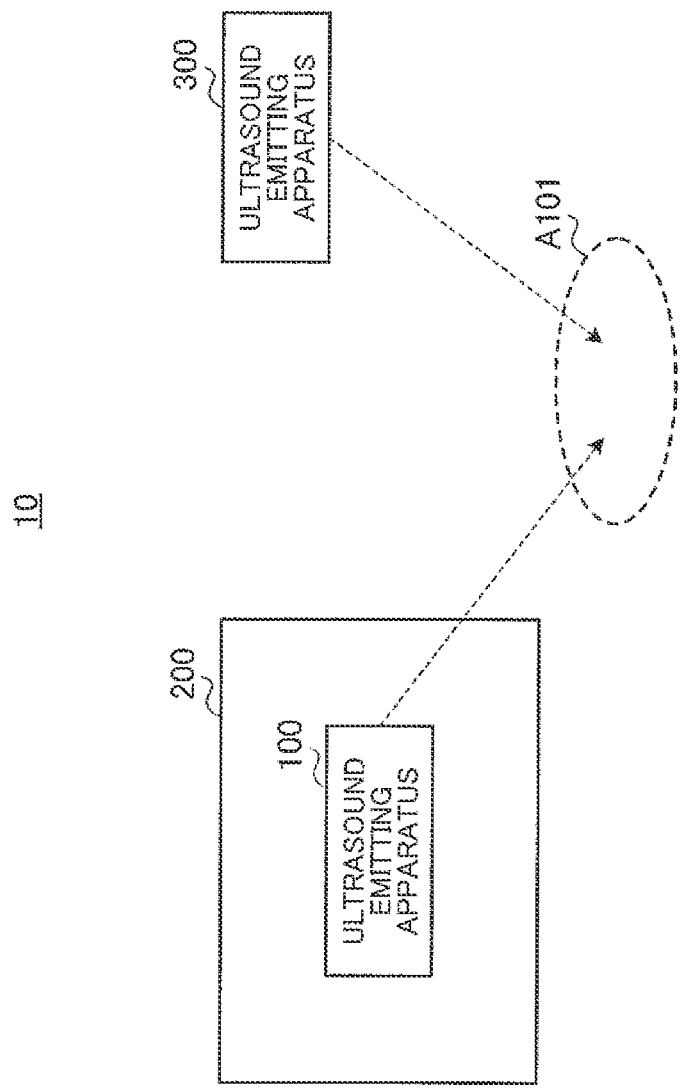
FIG. 1 is a block diagram showing a configuration of an attention calling system according to Embodiment 1 of the claimed invention.

Hereinafter, embodiments of the claimed invention will be described in detail with reference to the accompanying drawings. In the embodiments, the same components are denoted by the same reference numerals and their duplicated explanations are omitted.

[Embodiment 1]
[Summary of Attention Calling System 10]

FIG. 1 shows a configuration of attention calling system 10 according to Embodiment 1 of the claimed invention. In FIG. 1, attention calling system 10 includes ultrasound emitting apparatus 100 mounted on moving object 200 (e.g., a vehicle such as an automobile) and ultrasound emitting apparatus 300 fixedly placed close to area A101. Ultrasound emitting apparatus 300 is placed on a roadside structure such as a traffic light or a guardrail.

Ultrasound emitting apparatus 300 emits the first ultrasound wave (also referred to as frequency f1) to an area including at least area A101, and ultrasound emitting apparatus 100 emits the second ultrasound wave (also referred to as frequency f2). Accordingly, when moving object 200 comes close to an area covered by the ultrasound wave of ultrasound emitting apparatus 300, area A101 in which the first ultrasound wave and the second ultrasound wave overlap with each other is generated. In this area A101, the sound of frequency f2-f1 is generated. Specifically, ultrasound emitting apparatus 100 generates the second ultrasound wave through modulation of ultrasound signals of frequency f1 (that is, ultrasound signals having the same frequency as the first ultrasound wave) with audible signals. In other words, the ultrasound signals of frequency f1 are used as carriers. Thus, in area A101, sounds corresponding to the audible signals superimposed on the carriers by ultrasound emitting apparatus 100 are generated. Those sounds can warn a target person present in area A101.

As described above, in attention calling system 10 using a principle of a parametric speaker using a frequency shift between two types of ultrasound waves, placing ultrasound emitting apparatus 100 on moving object 200 can generate an audible area (in which a target person can catch a sound alarm) only when moving object 200 comes close to an area covered by the ultrasound wave of ultrasound emitting apparatus 300.

[Configuration of Ultrasound Emitting Apparatus 100]

Figure 2:
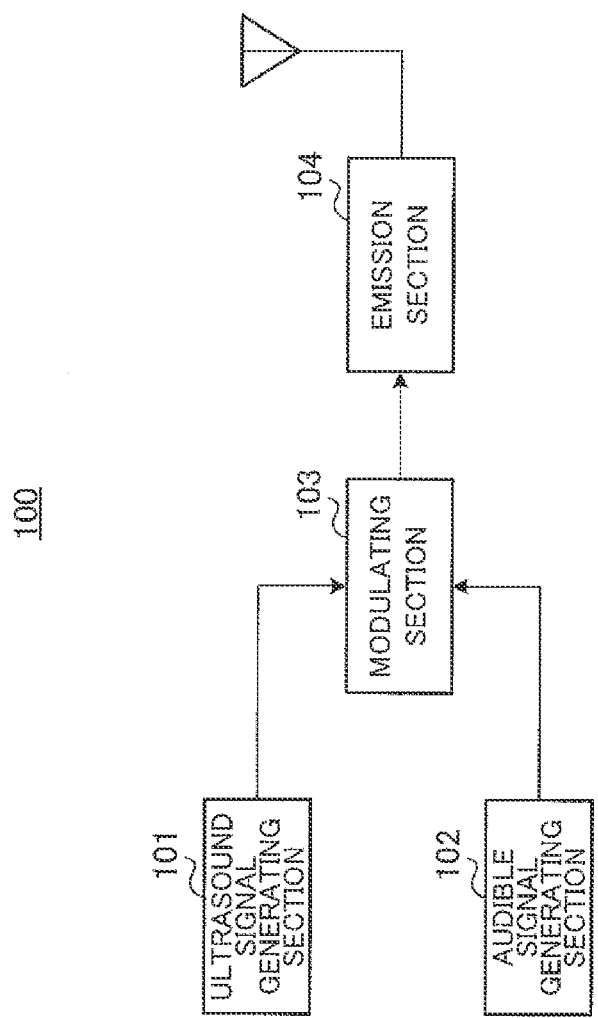
FIG. 2 is a block diagram showing a configuration of an ultrasound emitting apparatus according to Embodiment 1 of the claimed invention.

FIG. 2 shows a configuration of ultrasound emitting apparatus 100 according to Embodiment 1 of the claimed invention. In FIG. 2, ultrasound emitting apparatus 100 includes ultrasound signal generating section 101, audible signal generating section 102, modulation section 103, and emission section 104.

Ultrasound signal generating section 101 generates and outputs ultrasound signals having a predetermined frequency to modulation section 103.

Audible signal generating section 102 generates and outputs sound signals that are intended to be heard only by a target person (i.e., audible signals) to modulation section 103. The contents of the audible signals may be a message, such as "dangerous" or "be careful," melody or warning sounds. The bandwidth of audible signals is at least 20 Hz but not greater than 20 kHz. Since human ears are most sensitive to frequencies ranging from 1000 Hz to 3500 Hz, an audible region including this range is desirable.

Modulation section 103 forms modulation signals through modulation of the ultrasound signals generated at ultrasound signal generating section 101 with audible signals generated at audible signal generating section 102. The modulation signals are emitted through emission section 104.

[Configuration of Ultrasound Emitting Apparatus 300]

Figure 3:
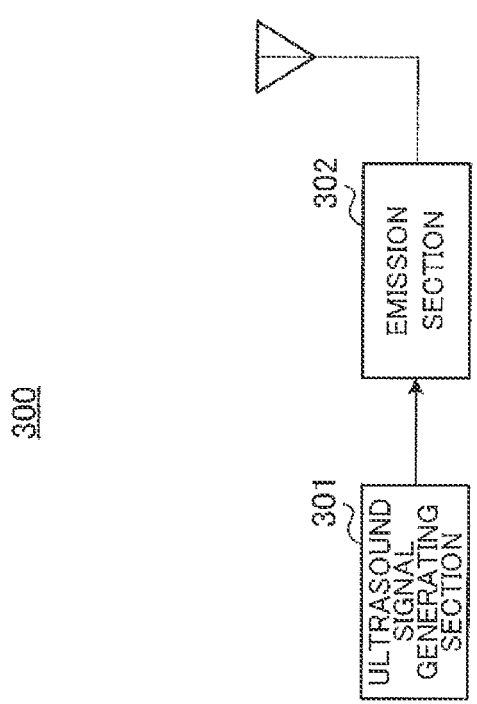
FIG. 3 is a block diagram showing a configuration of another ultrasound emitting apparatus according to Embodiment 1 of the claimed invention.

FIG. 3 shows a configuration of ultrasound emitting apparatus 300 according to Embodiment 1 of the claimed invention. In FIG. 3, ultrasound emitting apparatus 300 includes ultrasound signal generating section 301 and emission section 302.

Ultrasound signal generating section 301 generates ultrasound signals having a predetermined frequency. This predetermined frequency is the same as that of the ultrasound signals generated at ultrasound signal generating section 101. The generated ultrasound signals are emitted through emission section 302.

Figure 4:
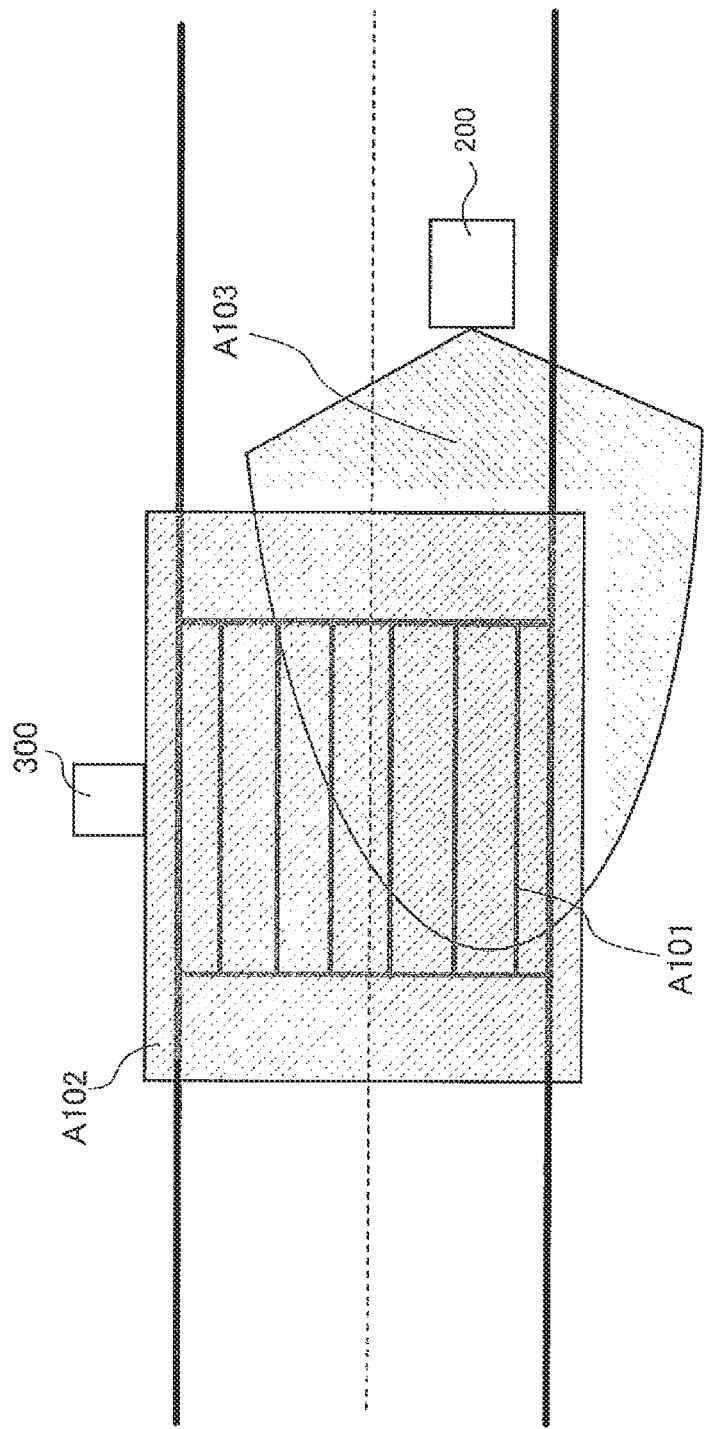
FIG. 4 explains the operation of the attention calling system.

[Operation of Attention Calling System 10] FIG. 4 explains the operation of attention calling system 10. In FIG. 4, ultrasound signal emitting apparatus 300 is fixedly placed close to a crosswalk and emits the first ultrasound wave (frequency f1). This first ultrasound wave entirely covers area A102. Meanwhile, ultrasound signal emitting apparatus 100 mounted on moving object 200 emits the second ultrasound wave that includes superimposed audible signals. The second ultrasound wave entirely covers area A103.

Area A102 and area A103 overlap with each other at area A101, and audible signals superimposed on the second ultrasound wave are generated in this area A101. Consequently, it is possible to allow a target person present in area A101 to hear the audible signals. Meanwhile, it is possible not to allow a non-target person (not shown in the drawing) present outside area A101 to hear the audible signals.

According to the present embodiment, in attention calling system 10 using a principle of a parametric speaker using a frequency shift between two types of ultrasound waves, placing ultrasound emitting apparatus 100 on moving object 200 can generate an audible area only when moving object 200 comes close to an area covered by the ultrasound wave of ultrasound emitting apparatus 300.

In the above explanation, the second ultrasound wave is generated through modulation of ultrasound signals of frequency f1 with audible signals. Alternatively, a frequency other than frequency f1 may be used to form the second ultrasound wave through modulation of the ultrasound signals having the frequency different from f1 with the audible signals. The frequency other than frequency f1 means a frequency that generates an audible sound with a difference in tone between f1 and f2, In the above description, ultrasound emitting apparatus 100 modulates ultrasound signals using audible signals and ultrasound emitting apparatus 300 does not modulate audible signals. Alternatively, ultrasound emitting apparatus 100 may not modulate audible signals and ultrasound emitting apparatus 300 may modulate the ultrasound signals using audible signals and emit the result.

[Embodiment 2]

In Embodiment 2, a frequency of ultrasound signals is controlled in consideration of the Doppler effect.

[Configuration of Ultrasound Emitting Apparatus 400]

Figure 5:
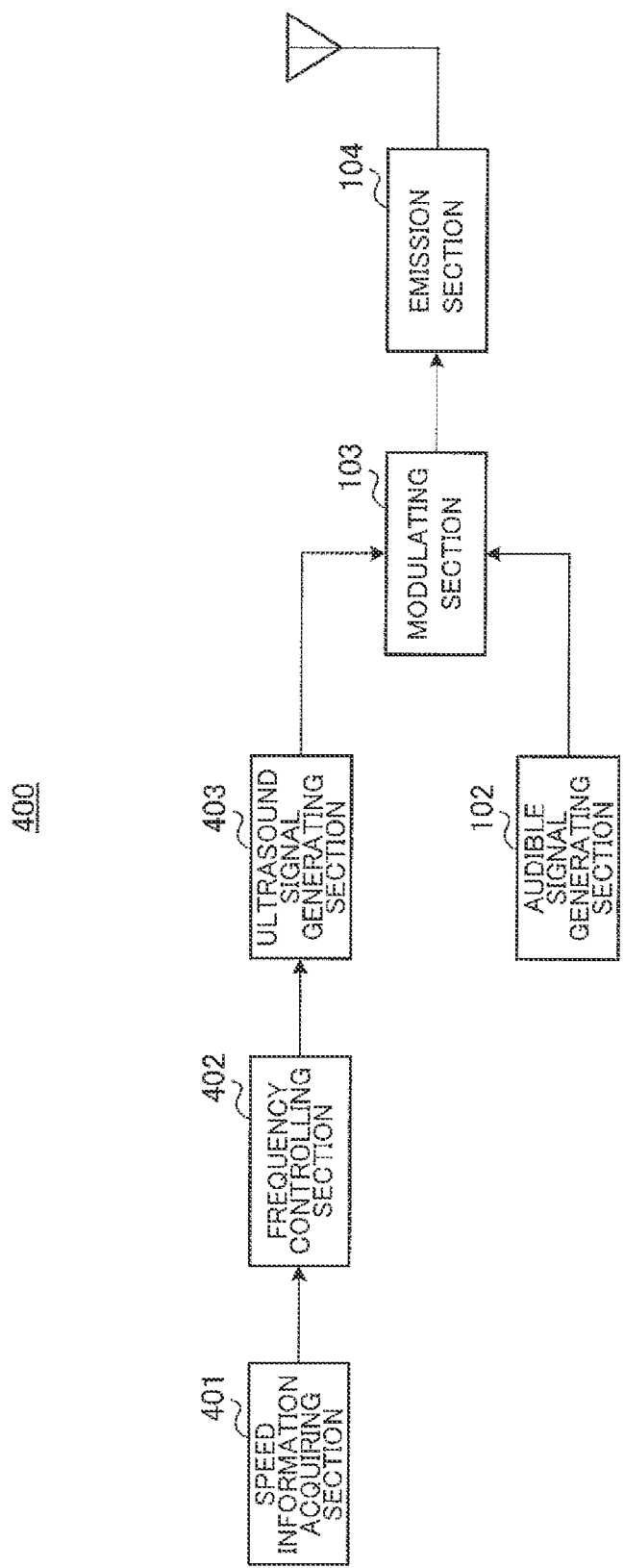
FIG. 5 is a block diagram showing a configuration of an ultrasound emitting apparatus according to Embodiment 2 of the claimed invention.

FIG. 5 shows a configuration of ultrasound emitting apparatus 400 according to Embodiment 2 of the claimed invention. Ultrasound emitting apparatus 400 is mounted on moving object 200 as ultrasound emitting apparatus 100.

In FIG. 5 ultrasound emitting apparatus 400 includes speed information acquiring section 401, frequency controlling section 402, and ultrasound signal generating section 403.

Speed information acquiring section 401 acquires speed information on the moving speed of moving object 200. The speed information is, for example, speed v1 acquired by a speed sensor provided in moving object 200. Instead, the number of turbine rotations of a torque converter in a transmission, or the number of drive shaft rotations in the transmission or the like may be used.

Frequency controlling section 402 calculates a target frequency based on the speed of moving object 200. In other words, based on the speed of moving object 200, frequency controlling section 402 firstly calculates a finite difference between a Doppler frequency and reference frequency f1 (i.e., frequency deviation Δf) when the ultrasound wave of frequency f1 is emitted. Then, frequency controlling section 402 calculates the target frequency through addition of reference frequency f1 and frequency deviation Δf. The frequency of ultrasound signals generated at ultrasound signal generating section 403 is adjusted based on this target frequency.

Figure 6:
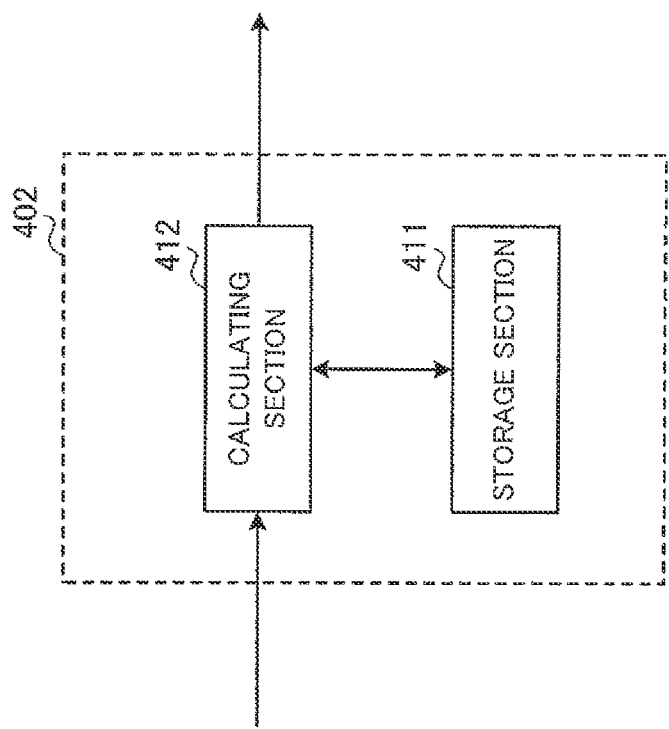
FIG. 6 is a block diagram showing a configuration of a frequency controlling section.

To be more specific, frequency controlling section 402 includes storage section 411 and calculation section 412 as shown in FIG. 6.

Figure 7:
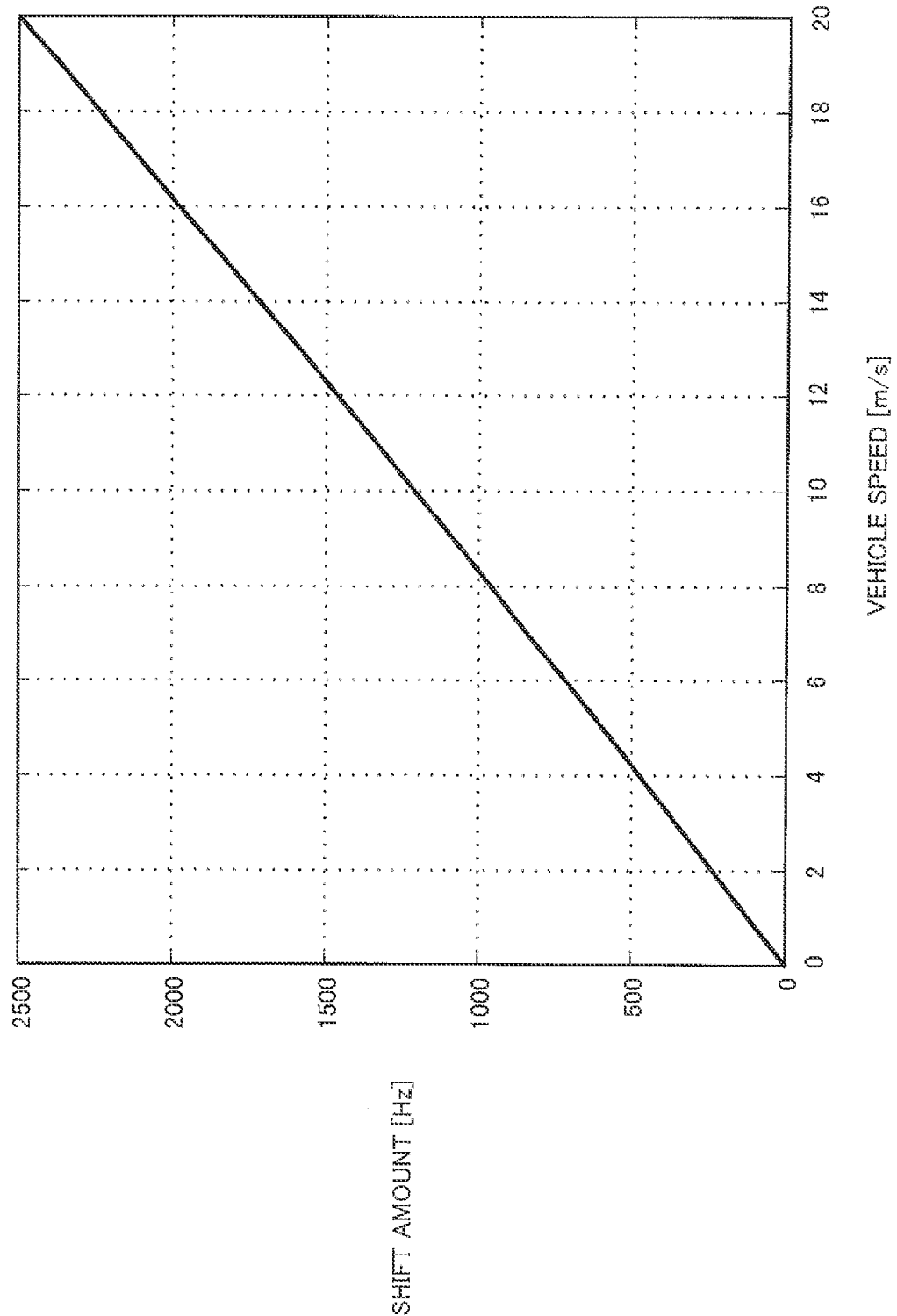
FIG. 7 shows a correspondence of the speed of a moving object and a frequency deviation.

Storage section 411 stores the correspondence between the speed of moving object 200 and frequency deviation Δf. FIG. 7 shows the correspondence in the case where reference frequency f1 is 40 Hz.

In the correspondence stored in storage section 411, calculation section 412 acquires the value of frequency deviation Δf associated with the speed of moving object 200 acquired from speed information acquiring section 401, and calculates the target frequency based on the acquired value of frequency deviation Δf and reference frequency f1.

Ultrasound signal generating section 403 generates ultrasound signals having the target frequency calculated at frequency controlling section 402 and outputs the result to modulation section 103.

Figure 8:
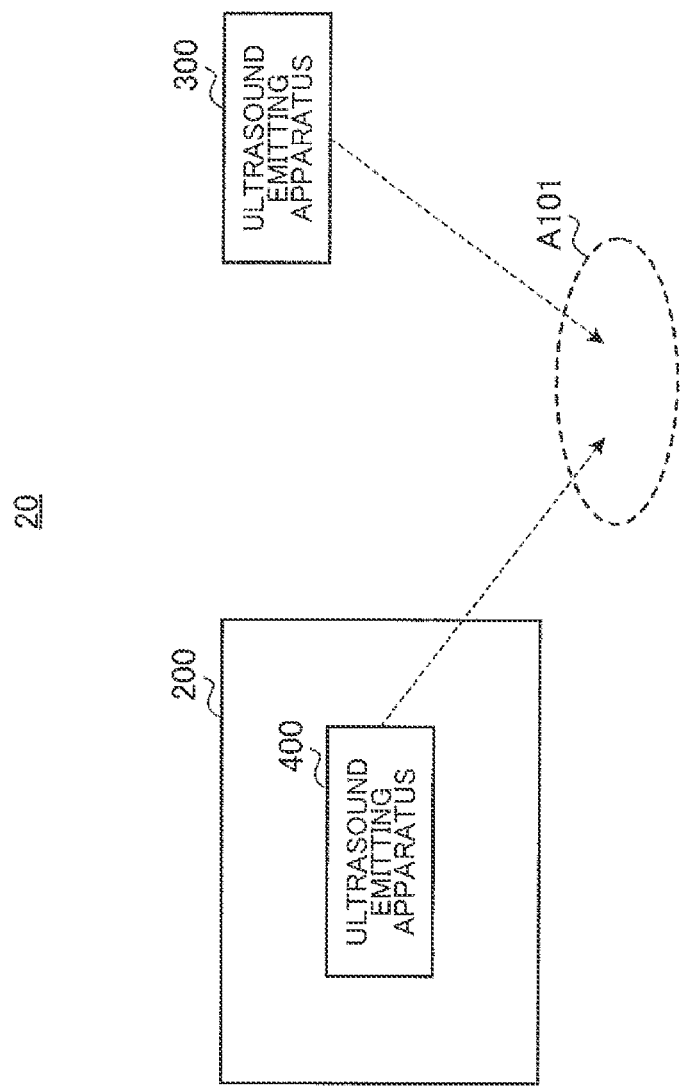
FIG. 8 is a block diagram showing a configuration of an attention calling system according to Embodiment 2 of the claimed invention.

[Operation of Attention Calling System 20] FIG. 8 explains the operation of attention calling system 20 according to Embodiment 2 of the claimed invention. In FIG. 8, ultrasound emitting apparatus 300 is fixedly placed close to a crosswalk and emits the first ultrasound wave (i.e., frequency f1).

Meanwhile, ultrasound emitting apparatus 400 emits audible signals by using ultrasound signals having a frequency corresponding to the speed of moving object 200 as carriers.

When moving object 200 moves, the ultrasound emitted from ultrasound emitting apparatus 400 is influenced by the Doppler effect.

FIG. 9 explains the Doppler effect. FIG. 9A shows an ultrasound wave when moving object 200 does not move, FIG. 9B shows an ultrasound wave when moving object 200 comes close to a target person, and FIG. 9C shows an ultrasound wave when moving object 200 moves away from the target person.

When the ultrasound emitted from ultrasound emitting apparatus 400 is influenced by such Doppler effect, a shift between the frequency of the carriers used in ultrasound emitting apparatus 400 and the frequency of the carrier used in ultrasound emitting apparatus 300 is caused. Consequently, the quality of audible signals to the target person present in area A101 may decrease. In other words, when moving object 200 is not moving, the target person can hear the sound corresponding to the audible signals. However, when moving object 200 moves toward the target person, the Doppler effect occurs in accordance with the speed of the moving object, and thus the frequency increases. For this reason, the generated sound becomes higher in pitch than the intended sound and may be inaudible by one who has a narrow audible frequency range.

In contrast, since ultrasound emitting apparatus 400 adjusts the carriers to a frequency corresponding to the speed of moving object 200, the carrier frequency emitted from ultrasound emitting apparatus 400 in audible area A101 is equal to the carrier frequency emitted from ultrasound emitting apparatus 300 in audible area A101. Accordingly, the quality of the audible signals can be maintained even when moving object 200 moves at a fast speed.

According to the present embodiment, in ultrasound emitting apparatus 400, frequency controlling section 402 adjusts the frequency of the ultrasound signals generated at ultrasound signal generating section 403, based on the speed of moving object 200.

Consequently, since the frequency of the ultrasound signals generated at ultrasound signal generating section 403 can be adjusted to the frequency in consideration of the Doppler effect, the carrier frequency emitted from ultrasound emitting apparatus 400 in audible, area A101 is equal to the carrier frequency emitted from ultrasound emitting apparatus 300 in audible area A101. Accordingly, the quality of the audible signals can be maintained even when moving object 200 moves at a fast speed.

In the above description, ultrasound emitting apparatus 100 modulates ultrasound signals using audible signals and ultrasound emitting apparatus 300 does not modulate audible signals. Alternatively, ultrasound emitting apparatus 100 may not modulate audible signals and ultrasound emitting apparatus 300 may modulate the ultrasound signals using audible signals and emit the result.

[Embodiment 3]

In Embodiment 3, the contents of audible signals are varied in accordance with the speed of a moving object.

Figure 10:
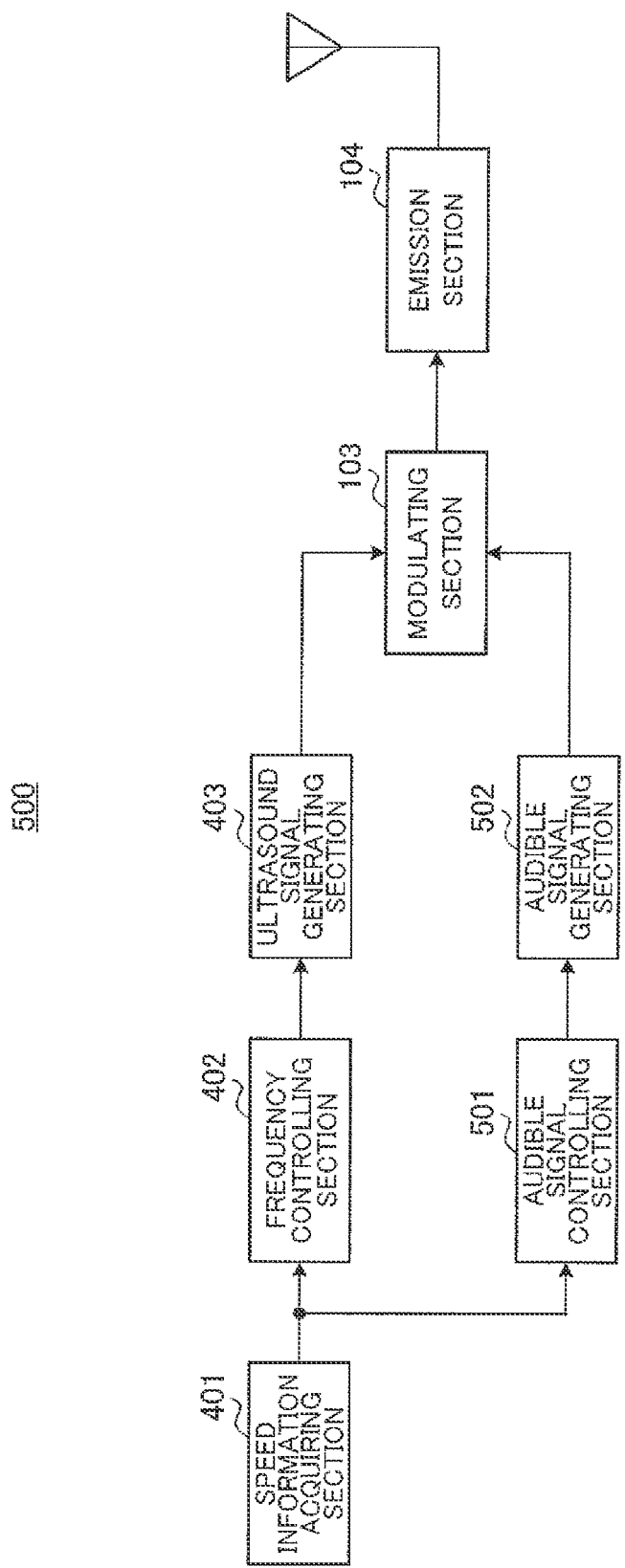
FIG. 10 is a block diagram showing a configuration of an ultrasound emitting apparatus according to Embodiment 3 of the claimed invention.

FIG. 10 shows a configuration of ultrasound emitting apparatus 500 according to Embodiment 3 of the claimed invention. Ultrasound emitting apparatus 500 is mounted on moving object 200. In FIG. 10, ultrasound emitting apparatus 500 includes audible signal controlling section 501 and audible signal generating section 502.

Audible signal controlling section 501 acquires speed information on moving object 200 from speed information acquiring section 401, and varies the contents of audible signals generated at audible signal generating section 502, based on the speed of moving object 200. To be more specific, audible signal controlling section 501 outputs identification information on the audible signals in accordance with the speed of moving object 200, to audible signal generating section 502. For example, the contents of the audible signals are defined as "dangerous" when the speed of the moving object is fast, and "a vehicle is coming close" when the speed of the moving object is slow. By this means, an easily-understandable warning can be given to pedestrians.

Audible signal generating section 502 generates audible signals corresponding to the identification information on the audible signals received from audible signal controlling section 501 and outputs the result to modulation section 103.

According to the present embodiment, audible signal controlling section 501 varies the contents of the audible signals generated at audible signal generating section 502 based on the speed of moving object 200.

By this means, for example, the easily-understandable warning can be given to the pedestrians.

Although the carrier frequency and the contents of the audible signals are varied based on the speed of moving object 200 in the above description, only the contents of the audible signals may be varied without changing the carrier frequency.

[Embodiment 4]

Embodiment 4 indicates an embodiment applicable even in a case where a plurality of fixedly placed ultrasound emitting apparatuses, which has different types of carrier frequencies, is present together in an attention calling system.

Figure 11:
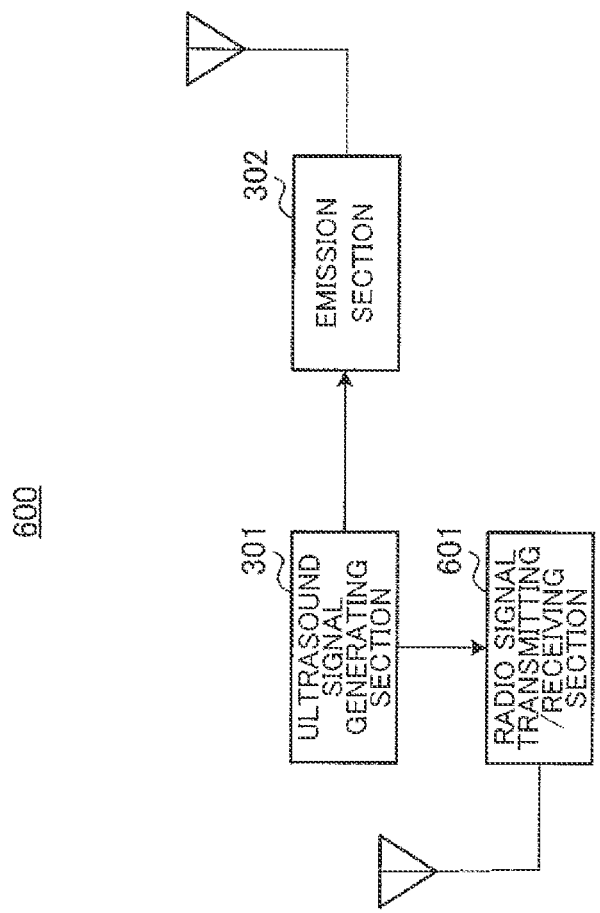
FIG. 11 is a block diagram showing a configuration of an ultrasound emitting apparatus according to Embodiment 4 of the claimed invention.

FIG. 11 shows a configuration of ultrasound emitting apparatus 600 according to Embodiment 4 of the claimed invention. In FIG. 11, ultrasound emitting apparatus 600 includes radio signal transmitting/receiving section 601.

Radio signal transmitting/receiving section 601 transmits reference frequency information on the frequency of the ultrasound signals generated at ultrasound signal generating section 301. Accordingly, ultrasound emitting apparatus 700, which is described, hereinafter and present around ultrasound emitting apparatus 600, can acquire the reference frequency information. A frequency common to a plurality of ultrasound emitting apparatuses 700 is transmitted as the reference frequency information.

Figure 12:
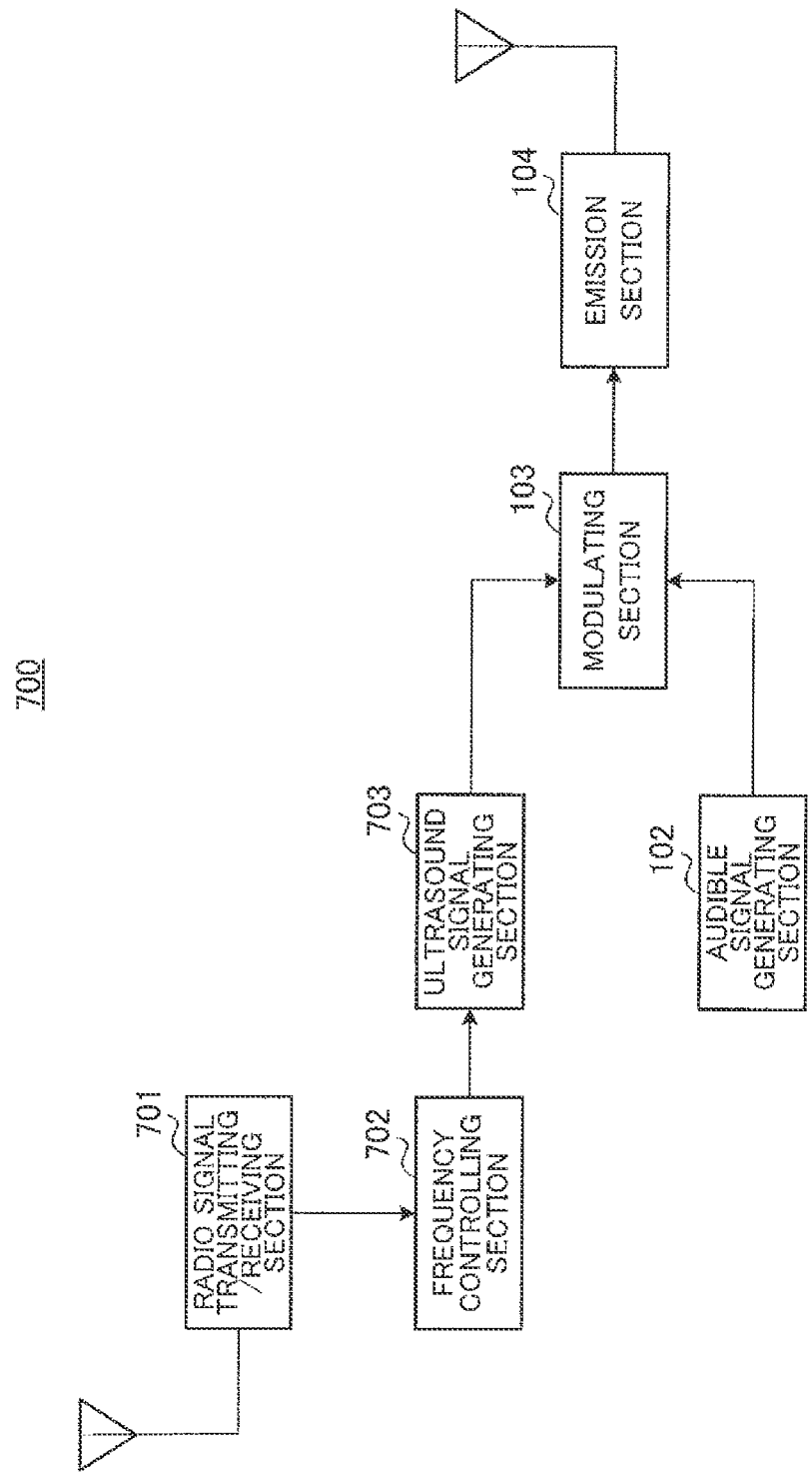
FIG. 12 is a block diagram showing a configuration of another ultrasound emitting apparatus according to Embodiment 4 of the claimed invention.

FIG. 12 shows a configuration of ultrasound emitting apparatus 700 according to Embodiment 4 of the claimed invention. Ultrasound emitting apparatus 700 is mounted on moving object 200. In FIG. 12, ultrasound emitting apparatus 700 includes radio signal transmitting/receiving section 701, frequency controlling section 702, and ultrasound signal generating section 703.

Radio signal transmitting/receiving section 701 receives the reference frequency information transmitted from ultrasound emitting apparatus 600 and outputs the information to frequency controlling section 702.

Frequency controlling section 702 receives the reference frequency information from radio signal transmitting/receiving section 701 and sets a target frequency based on the reference frequency information. Frequency controlling section 702 sets the target frequency to the frequency indicated by the reference frequency information.

Ultrasound signal generating section 703 generates ultrasound signals having the target frequency set at frequency controlling section 702 and outputs the result to modulation section 103.

According to the present embodiment, ultrasound emitting apparatus 700 can use the ultrasound signals of the frequency corresponding to the frequency information transmitted from ultrasound emitting apparatus 600 as carriers. Consequently, even when a plurality of ultrasound emitting apparatuses 600 having different types of the carrier frequency is present together in the attention calling system, ultrasound emitting apparatus 700 can use the carriers equal to the frequency of ultrasound emitting apparatuses 600 present around ultrasound emitting apparatus 700.

In the above description, ultrasound emitting apparatus 700 has a configuration formed by adding radio signal transmitting/receiving section 701 to the configuration of ultrasound emitting apparatus 100. However, the claimed invention is not limited to such an embodiment, and ultrasound emitting apparatus 700 may have a configuration formed by adding radio signal transmitting/receiving section 701 to the configuration of ultrasound emitting apparatus 400 of Embodiment 2. In this case, frequency controlling section 702 calculates the target frequency base on the speed of moving object 200 received from speed information acquiring section 401 and the reference frequency information received from radio signal transmitting/receiving section 701. Specifically, frequency controlling section 702 calculates frequency deviation $\Delta f$ based on the speed of moving object 200. Then, frequency controlling section 702 calculates the target frequency through addition of the reference frequency indicated by the reference frequency information and frequency deviation $\Delta f$.

[Embodiment 5]

In Embodiment 5, a fixedly placed ultrasound emitting apparatus switches a frequency of ultrasound signals based on traffic light information indicating the status of a traffic light. This ultrasound emitting apparatus transmits signal status information and frequency information on a frequency associated with a traffic lane. Additionally, the ultrasound emitting apparatus mounted on a moving object generates carriers using the frequency corresponding to the traffic lane on which a moving object runs.

Figure 13:
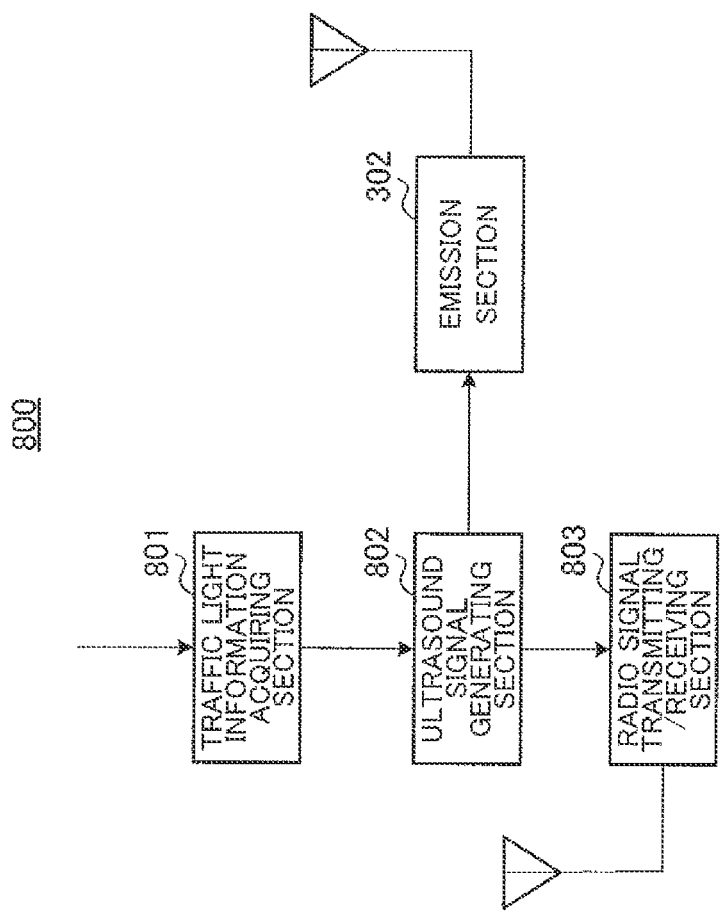
FIG. 13 is a block diagram showing a configuration of an ultrasound emitting apparatus according to Embodiment 5 of the claimed invention.

FIG. 13 shows a configuration of ultrasound emitting apparatus 800 according to Embodiment 5 of the claimed invention. Ultrasound emitting apparatus 800 is fixedly placed close to an intersection. In FIG. 13, ultrasound emitting apparatus 800 includes traffic light information acquiring section 801, ultrasound signal generating section 802, and radio signal transmitting/receiving section 803.

Traffic light information acquiring section 801 acquires the traffic light status information representing the status of a traffic light that is connected without or with a cable to ultrasound emitting apparatus 800 and is placed on an intersection. The traffic light status information includes information on the traffic light status (e.g., red or green) corresponding to each traffic lane.

Ultrasound signal generating section 802 switches a frequency of ultrasound signals based on the traffic light status information acquired at traffic light information acquiring section 801. Accordingly, ultrasound signal generating section 802 generates ultrasound signals having the frequency corresponding to the traffic light status.

Radio signal transmitting/receiving section 803 transmits frequency information on correspondence between each traffic lane and the frequency.

Figure 14:
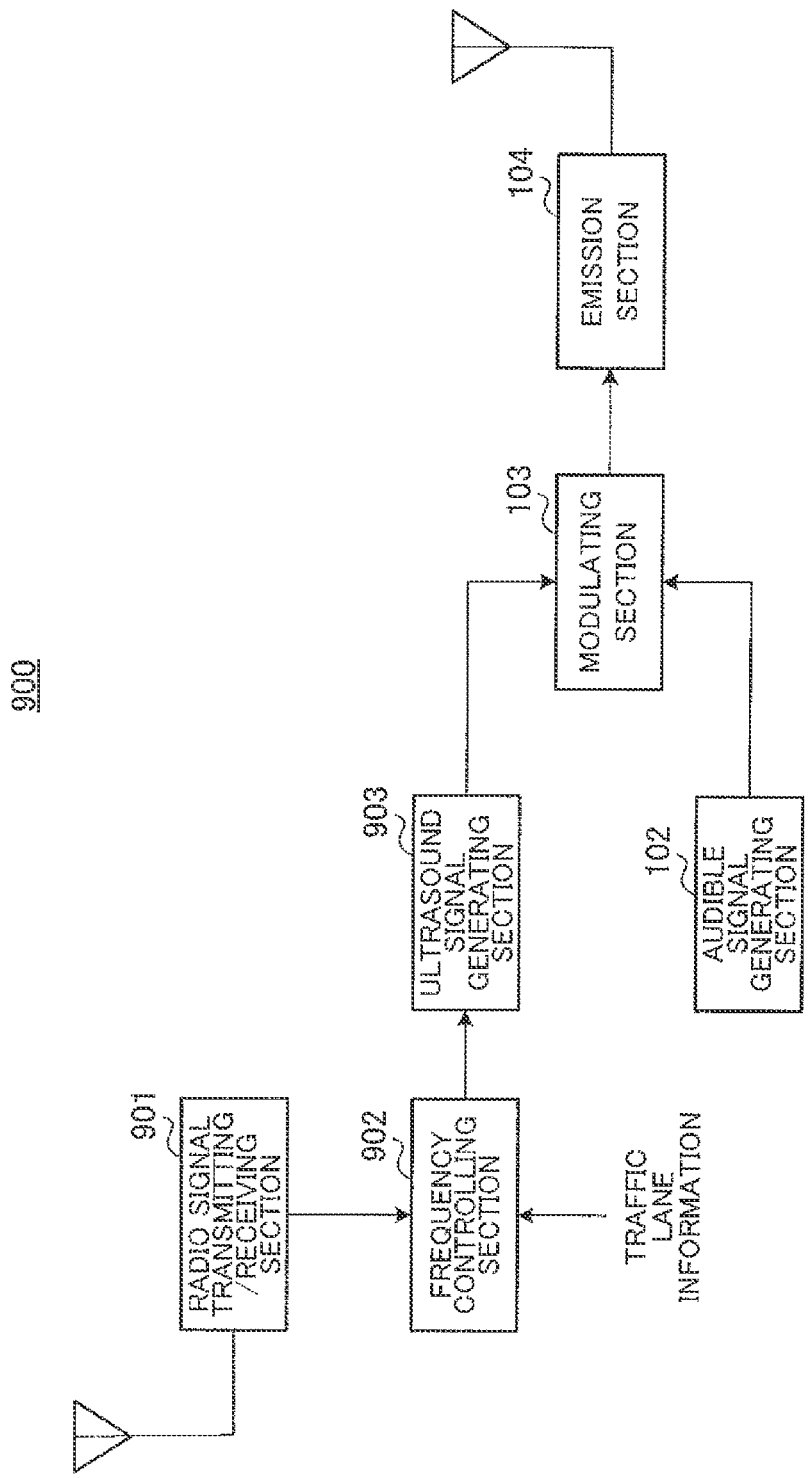
FIG. 14 is a block diagram showing a configuration of another ultrasound emitting apparatus according to Embodiment 5 of the claimed invention.

FIG. 14 shows a configuration of ultrasound emitting apparatus 900 according to Embodiment 5 of the claimed invention. Ultrasound emitting apparatus 900 is mounted on moving object 200. Ultrasound emitting apparatus 900 includes radio signal transmitting/receiving section 901, frequency controlling section 902, and ultrasound signal generating section 903.

Radio signal transmitting/receiving section 901 receives the frequency information transmitted from ultrasound emitting apparatus 800 and outputs the result to frequency controlling section 902.

Frequency controlling section 902 acquires traffic lane information on the traffic lane on which moving object 200 runs. The traffic lane information is acquired from a vehicle navigation system, for example. Frequency controlling section 902 outputs the information on a frequency associated with the traffic lane indicated by the traffic lane information in the frequency information to ultrasound signal generating section 903. Accordingly, ultrasound signal generating section 903 generates ultrasound signals having a frequency corresponding to the traffic lane.

Figure 15:
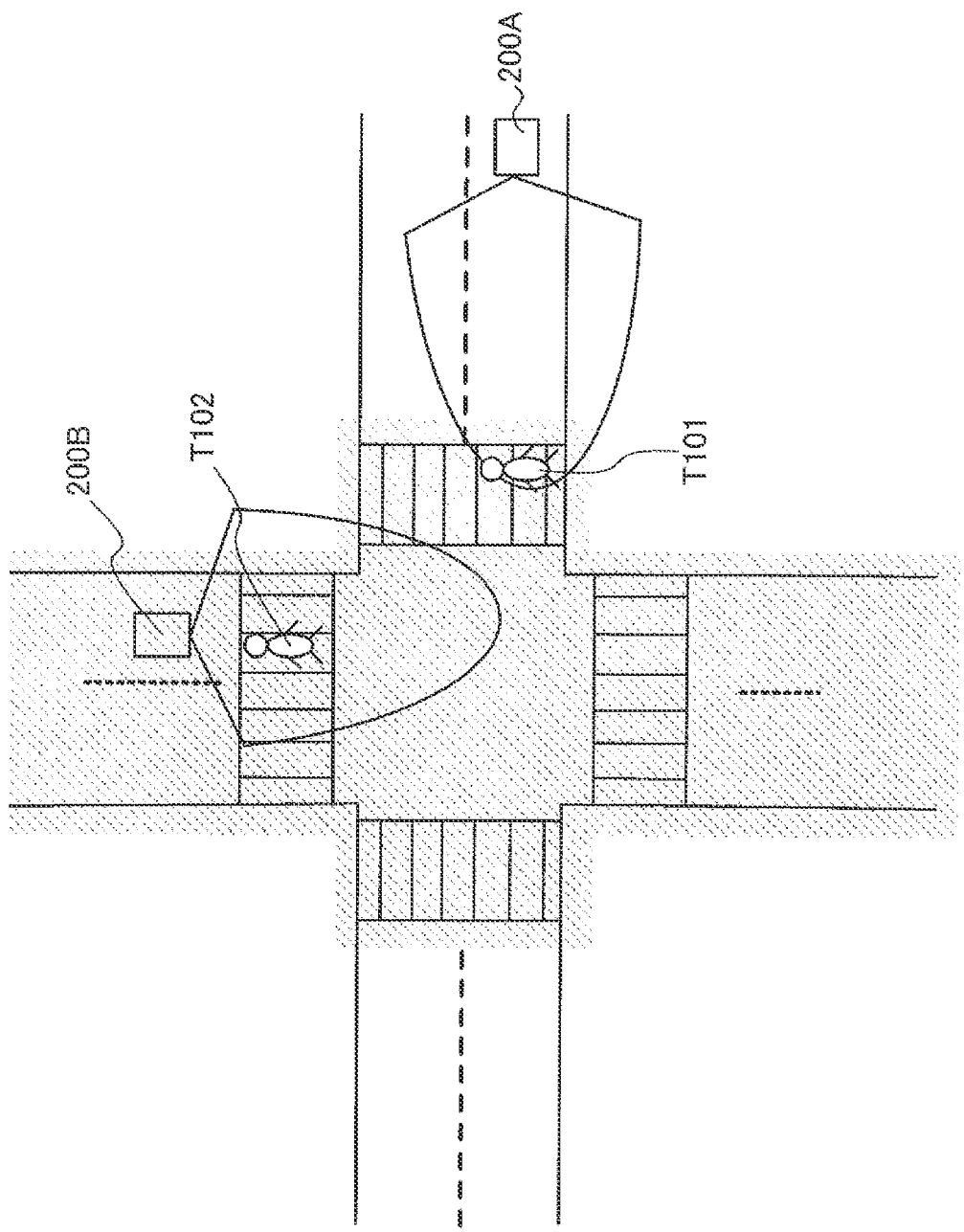
FIG. 15 explains the operation of an attention calling system according to Embodiment 5 of the claimed invention.
Figure 16:
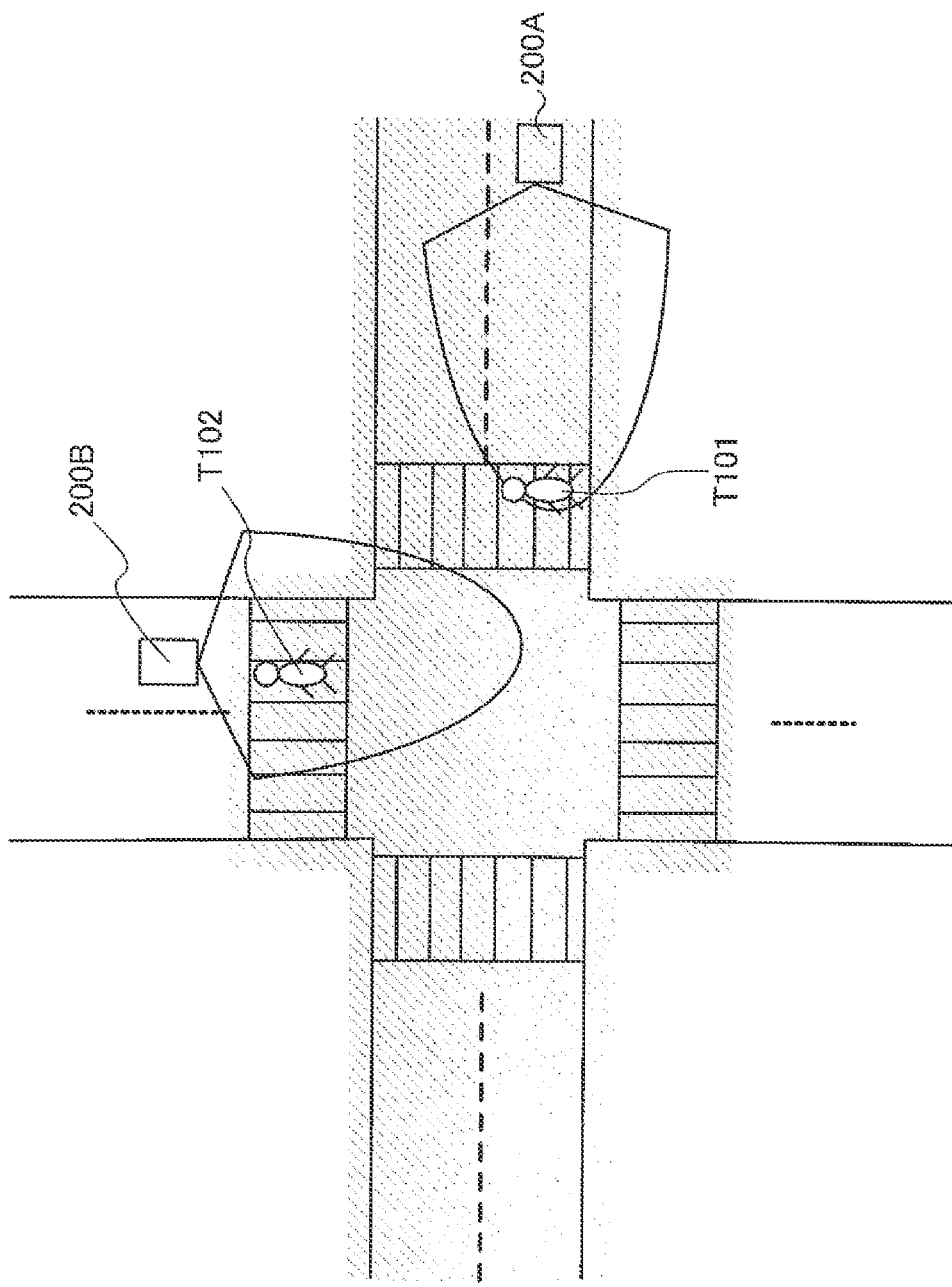
FIG. 16 further explains the operation of the attention calling system according to Embodiment 5 of the claimed invention.

FIGS. 15 and 16 explain the operation of the attention calling system according to Embodiment 5 of the claimed invention.

in FIG. 15, a traffic light in the vertical direction is green and a traffic light in the horizontal direction is red. Meanwhile, in FIG. 16, a traffic light in the vertical direction is red and a traffic light in the horizontal direction is green.

As described above, ultrasound emitting apparatus 800 switches a frequency of ultrasound signals based on the traffic light status information acquired at traffic light information acquiring section 801. In other words, ultrasound emitting apparatus 800 uses carriers of frequency f3 in the case of the traffic light status as in FIG. 15, and uses carriers of frequency f4 different from those of frequency f3 in the case of the traffic light status as in FIG. 16.

Meanwhile, ultrasound emitting apparatus 900 mounted on moving object 200 A has acquired the traffic lane information and sets the carrier frequency to the frequency associated with the traffic lane indicated by the traffic lane information in the frequency information transmitted from ultrasound emitting apparatus 800. In other words, since the traffic lane of moving object 200 A corresponds to the traffic lanes in the horizontal direction in FIGS. 15 and 16, ultrasound emitting apparatus 900 mounted on moving object 200 A uses the carriers of frequency f4. In contrast, ultrasound emitting apparatus 900 mounted on moving object 200 B uses the carriers of frequency f3.

Accordingly, in the traffic light status in FIG. 15, while audible signals are generated in the area in which target person T102 is present, the audible signals are not generated in the area in which target person T101 is present. On the contrary, in the traffic light status in FIG. 16, while the audible signals are generated in the area in which target person T101 is present, the audible signals are not generated in the area in which target person T102 is present.

According to the present embodiment, in ultrasound emitting apparatus 900, radio signal transmitting/receiving section 901 receives the frequency information transmitted from ultrasound emitting apparatus 800, and frequency controlling section 902 adjusts a frequency of the ultrasound signals generated at ultrasound signal generating section 903 to the frequency associated with the traffic lane of moving object 200 in the frequency information.

Consequently, when ultrasound emitting apparatus 800 emits the ultrasound wave of the frequency associated with the traffic lane in which the traffic light status is green, the frequency is equal only to the carrier frequency emitted from ultrasound emitting apparatus 900 mounted on moving object 200 entering an intersection. For example, since a vehicle in the traffic lane in which the traffic light is red stops, calling attention of pedestrians on a crosswalk to this vehicle is not required. However, calling attention of the pedestrians to a vehicle that makes a right or left turn from the traffic lane in which the traffic light is green is necessary. Thus, warning can be given only to threatened target persons.

[Embodiment 6]

In Embodiment 6, the direction of output ultrasound wave is controlled to be the direction in which a moving object makes a turn.

Figure 17:
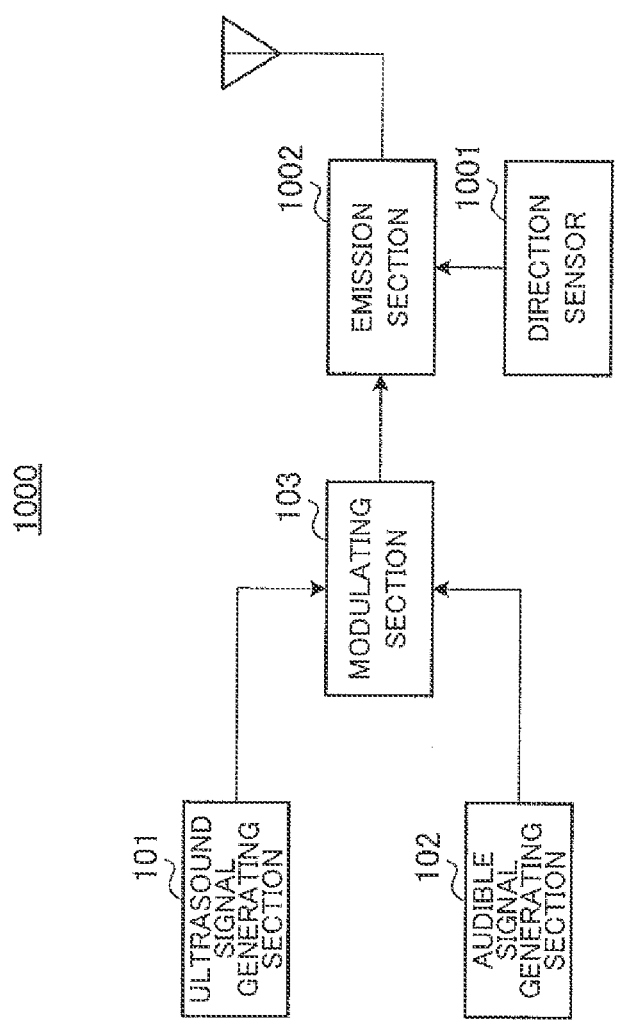
FIG. 17 is a block diagram showing a configuration of an ultrasound emitting apparatus according to Embodiment 6 of the claimed invention.

FIG. 17 shows a configuration of ultrasound emitting apparatus 1000 according to Embodiment 6 of the claimed invention. In FIG. 17, ultrasound emitting apparatus 1000 includes direction sensor 1001 and emission section 1002.

Direction sensor 1001 acquires information on the direction in which moving object 200 provided with ultrasound emitting apparatus 100 makes a turn, and outputs the result to emission section 1002.

Emission section 1002 controls the direction of output ultrasound wave so that the direction of the output ultrasound wave is equal to the direction in which moving object 200 makes a turn. In other words, emission section 1002 controls the directivity of the ultrasound wave in accordance with the direction in which moving object 200 makes a turn.

Consequently, when moving object 200 makes a turn, an area that the moving object is to arrive can be defined as an audible area before the anteroposterior direction of moving object 200 is equal to the direction toward the area that the moving object is to arrive. For this reason, it is possible to call attention of target persons present in the area that the moving object is to reach, in the early phase.

[Embodiment 7]

In Embodiment 7, when the direction of the emitted ultrasound wave and the direction of a moving object (that is, the anteroposterior direction of the moving object) form an angle (i.e., angle not equal to 0°), the frequency of ultrasound signals is varied based on components of the speed of the moving object corresponding to the direction of the emitted ultrasound signals.

Figure 18:
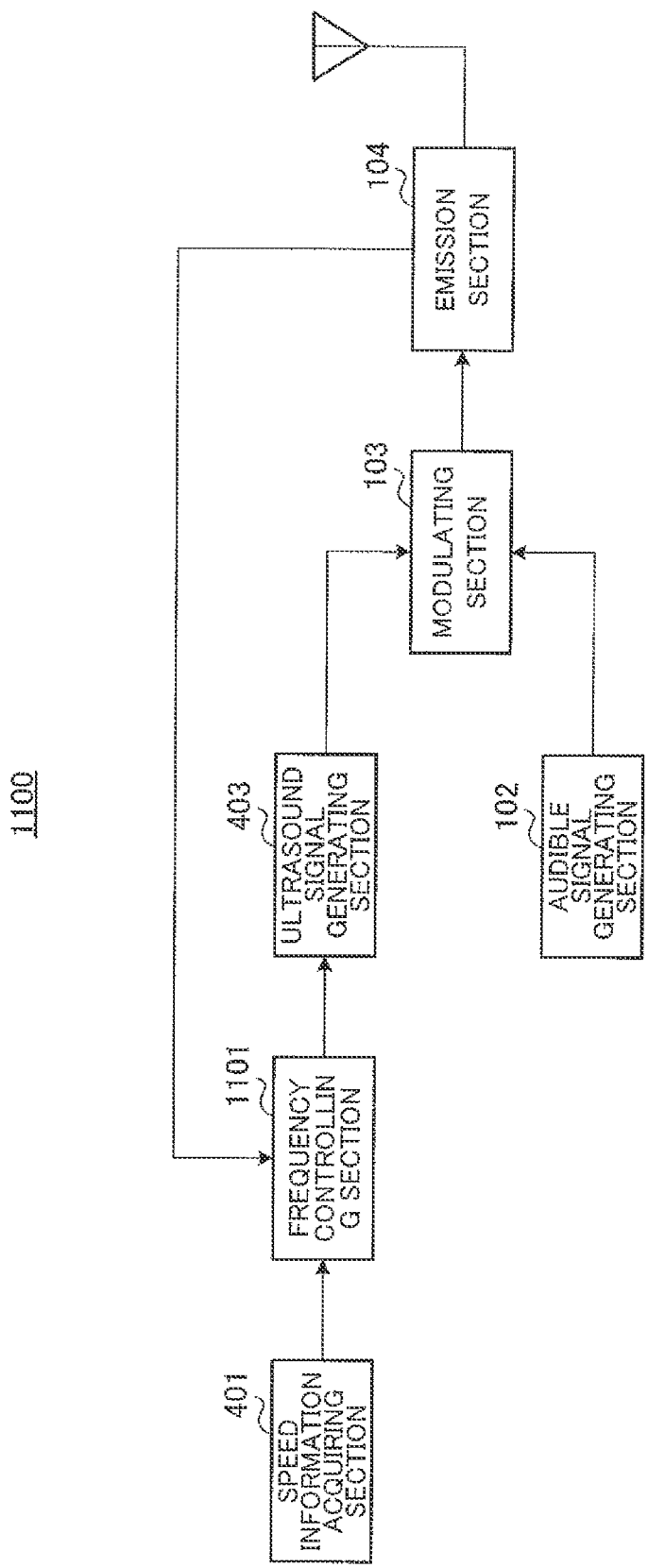
FIG. 18 is a block diagram showing a configuration of an ultrasound emitting apparatus according to Embodiment 7 of the claimed invention.

FIG. 18 shows a configuration of ultrasound emitting apparatus 1100 according to Embodiment 7 of the claimed invention. Ultrasound emitting apparatus 1100 is mounted on moving object 200. In FIG. 18, ultrasound emitting apparatus 1100 includes frequency controlling section 1101.

Frequency controlling section 1101 acquires the direction of the emitted ultrasound wave, from emission section 104. Frequency controlling section 1101 calculates the speed components corresponding to the direction of the emitted ultrasound wave based on the moving speed of moving object 200 and the direction of the emitted ultrasound wave, and calculates the target frequency based on the calculated moving speed.

Consequently, a carrier frequency in consideration of the Doppler effect can be provided, even when the direction of the emitted ultrasound wave and the direction of moving object 200 (that is, the anteroposterior direction of the moving object) form an angle (i.e., angle not equal to 0°).

[Embodiment 8]

Embodiment 8 is a combination of Embodiment 6 and Embodiment 7.

Figure 19:
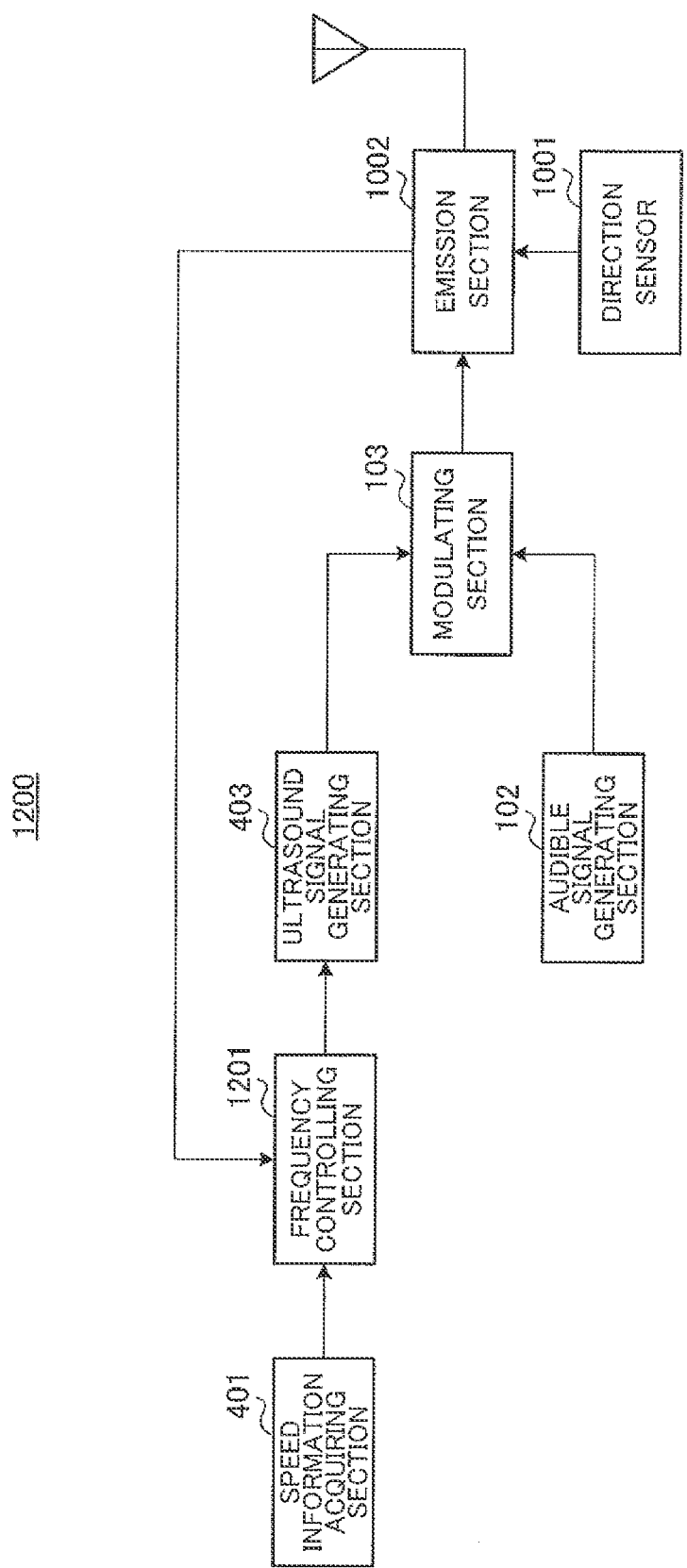
FIG. 19 is a block diagram showing a configuration of an ultrasound emitting apparatus according to Embodiment 8 of the claimed invention.

FIG. 19 shows a configuration of ultrasound emitting apparatus 1200 according to Embodiment 8 of the claimed invention. In FIG. 19, ultrasound emitting apparatus 1200 includes frequency controlling section 1201.

Frequency controlling section 1201 acquires the direction of output ultrasound wave, from emission section 1002. Frequency controlling section 1201 calculates the speed components corresponding to the direction of the emitted ultrasound wave based on the moving speed of moving object 200 and the direction of the output ultrasound wave and calculates the target frequency based on the calculated moving speed.

By this means, Embodiment 8 can acquire the effect of Embodiment 6 and Embodiment 7.

[Other Embodiments]

(1) Embodiment 1 assumes that ultrasound emitting apparatus 100 and ultrasound emitting apparatus 300 use ultrasound signals having the same and single frequency, and the audible signals transmitted from ultrasound emitting apparatus 100 are also one kind. However, the claimed invention is not limited to such an embodiment, and ultrasound emitting apparatus 100 and ultrasound emitting apparatus 300 may emit a plurality of ultrasound waves, each having a frequency common to the two apparatuses. In this case, ultrasound emitting apparatus 100 superimposes audible signals having different contents on a plurality of ultrasound signals having different frequencies.

(2) Although the above embodiments have described an example where the claimed invention is implemented with hardware, the claimed invention can be implemented with software.

Each function block employed in the explanation of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Furthermore, the method of circuit integration is not limited to LSI's, and implementation using dedicated circuitry general purpose processors is also possible. After LSI manufacture, utilization of a programmable field programmable gate array (FPGA) or a reconfiguraable processor where connections and settings of circuit cells within an LSI can be reconfigured is also possible.

Furthermore, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2010-152046, filed on oar Jul. 2, 2010, including the specification, drawings and abstract, is incorporated herein by reference in its entirety.

Industrial Applicability

A sound generating system, an ultrasound emitting apparatus, and a method of emitting an ultrasound wave of the claimed invention is useful since they use a principle of a parametric speaker with reference to a frequency shift between two types of ultrasound waves and allows a target person present in a predetermined area to hear a sound alarm only when a moving object moves close to the predetermined area.

Moreover, the claimed invention is advantageous because the invention is, for example:

usable regardless of weather conditions such as rain (the same effects are brought about on the road side and the moving object side);

usable in a place other than an intersection;

usable in an object other than a vehicle and also as a train alarm;

usable as a means for announcing advertisement or the like to a pedestrian;

configured to allow a pedestrian to know that a vehicle comes close, by being attached to the vehicle, such as a hybrid vehicle and an electric vehicle having small running sound;

configured to allow other people to know the presence of a wheel chair that is in a blind corner in a hospital, for example; and applicable to a visually handicapped person in the same way described above.

REFERENCE SIGNS LIST

10 Attention calling system
100, 300, 400, 500, 600, 700, 800, 900, 1000, 1100, 1200 Ultrasound emitting apparatus
101, 301, 403, 703, 802, 903 Ultrasound signal generating section
102, 502 Audible signal generating section
103 Modulation section
104, 302, 1002 Emission section
200 Moving object
401 Speed information acquiring section
402, 702, 902, 1101, 1201 Frequency controlling section
411 Storage section
412 Calculation section
501 Audible signal controlling section
601, 701, 803, 901 Radio signal transmitting/receiving section
801 Traffic light information acquiring section
1001 Direction sensor

The invention claimed is:

1. An ultrasound emitting apparatus that is mounted on a moving object and emits an ultrasound wave, the ultrasound emitting apparatus comprising:
   an ultrasound signal generating section that generates ultrasound signals;
   an audible signal generating section that generates audible signals;
   an information acquiring section that acquires information on the speed of the moving object;
   a frequency controlling section that adjusts a frequency of the ultrasound signals based on the speed of the moving object; and
   a modulation section that generates the ultrasound wave through modulation of the ultrasound signals with the audible signals,
   wherein the frequency controlling section comprises:
      a storage section that stores correspondence of the speed and a frequency deviation that is a finite difference between a Doppler frequency and a reference frequency of the ultrasound signals; and a calculation section that calculates a target frequency of the ultrasound signals through calculation of the frequency deviation associated with the speed of the moving object in the correspondence and addition of the calculated frequency deviation and the reference frequency.

2. The ultrasound emitting apparatus according to claim 1, further comprising an audible signal controlling section that varies contents of the audible signals in accordance with the speed of the moving object.

3. The ultrasound emitting apparatus according claim 1, further comprising:
   a reception section that receives information on a reference frequency of ultrasound signal that are transmitted from another ultrasound emitting apparatus and are used by the other ultrasound emitting apparatus; and
   a frequency controlling section that adjusts a frequency of the ultrasound signals to be the same frequency as the reference frequency of the other ultrasound emitting apparatus.

4. The ultrasound emitting apparatus according to claim 1, further comprising:
   a reception section that receives frequency information on a frequency associated with a traffic lane in an intersection, from another ultrasound emitting apparatus placed close to the intersection; and
   a frequency controlling section that adjusts a frequency of the ultrasound signals to be a frequency associated with the traffic lane of the moving object in the frequency information.

5. The ultrasound emitting apparatus according to claim 1, further comprising:
   a detection section that detects a direction in which a moving object makes a turn; and
   an emission section that emits the ultrasound wave and controls a direction of the emitted ultrasound wave to be the direction in which the moving object makes a turn.

6. The ultrasound emitting apparatus according to claim 1, further comprising:
   an information acquiring section that acquires information on the speed of the moving object; and
   a frequency controlling section that calculates speed components of the speed of the moving object corresponding a direction of the emitted ultrasound wave, based on the speed of the moving object and the direction of the emitted ultrasound wave and adjusts a frequency of the ultrasound signals based on the calculated speed components.

* * * * *